(12) United States Patent
Yoo et al.

(10) Patent No.: US 12,438,208 B2
(45) Date of Patent: Oct. 7, 2025

(54) BATTERY SYSTEM THERMAL EVENT DETECTION METHOD AND BATTERY SYSTEM USING THE SAME

(71) Applicant: LG Energy Solution, Ltd., Seoul (KR)

(72) Inventors: Solji Yoo, Daejeon (KR); Hyeon Jin Song, Daejeon (KR); Wongon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 368 days.

(21) Appl. No.: 17/927,424

(22) PCT Filed: Sep. 27, 2021

(86) PCT No.: PCT/KR2021/013136
§ 371 (c)(1),
(2) Date: Nov. 23, 2022

(87) PCT Pub. No.: WO2022/080699
PCT Pub. Date: Apr. 21, 2022

(65) Prior Publication Data
US 2023/0291021 A1    Sep. 14, 2023

(30) Foreign Application Priority Data
Oct. 14, 2020    (KR) .................... 10-2020-0132500

(51) Int. Cl.
*H01M 10/48* (2006.01)
*G01R 27/02* (2006.01)
(Continued)

(52) U.S. Cl.
CPC ........ *H01M 10/486* (2013.01); *G01R 31/007* (2013.01); *G01R 31/382* (2019.01);
(Continued)

(58) Field of Classification Search
CPC ............. H01M 10/486; H01M 10/425; H01M 10/482; G01R 31/382; G01R 31/007; G01R 27/025
See application file for complete search history.

(56) References Cited

U.S. PATENT DOCUMENTS

2003/0027036 A1    2/2003    Emori et al.
2013/0093383 A1    4/2013    Kim et al.
(Continued)

FOREIGN PATENT DOCUMENTS

CN        108963361 A        12/2018
JP        H11191436 A        7/1999
(Continued)

OTHER PUBLICATIONS

International Search Report for Application No. PCT/KR2021/013136 mailed Jan. 4, 2022, pp. 1-3.
(Continued)

*Primary Examiner* — Sarah A. Slifka
(74) *Attorney, Agent, or Firm* — Lerner David LLP

(57) ABSTRACT

A battery system includes a battery pack including a plurality of battery cells a pressure sensor located inside the battery pack to measure an internal pressure of the battery pack every sampling cycle, and a battery management system calculating a reference pressure based on an average of internal pressures measured at sampling cycles for a sampling period, calculating a pressure fluctuation amount based on a difference of the internal pressure measured every sampling cycle from the reference pressure, and determining that a thermal event has occurred in the battery pack if the internal pressure measured every sampling cycle increases consecutively at least two times when the pressure fluctuation amount is greater than or equal to a predetermined threshold pressure.

13 Claims, 3 Drawing Sheets

(51) Int. Cl.
  *G01R 31/00*  (2006.01)
  *G01R 31/382*  (2019.01)
  *H01M 10/42*  (2006.01)

(52) U.S. Cl.
  CPC ....... *H01M 10/425* (2013.01); *H01M 10/482* (2013.01); *G01R 27/025* (2013.01); *H01M 2010/4271* (2013.01)

(56) References Cited

U.S. PATENT DOCUMENTS

| | | | |
|---|---|---|---|
| 2017/0331157 | A1 | 11/2017 | Newman et al. |
| 2018/0006342 | A1 | 1/2018 | Lee et al. |
| 2018/0241020 | A1 | 8/2018 | Lampe-Onnerud et al. |
| 2020/0086745 | A1 | 3/2020 | Kim |

FOREIGN PATENT DOCUMENTS

| | | |
|---|---|---|
| JP | 2009076265 A | 4/2009 |
| JP | 2015155678 A | 8/2015 |
| JP | 5881593 B2 | 3/2016 |
| JP | 2017085735 A | 5/2017 |
| JP | 2017157448 A | 9/2017 |
| KR | 100677324 B1 | 2/2007 |
| KR | 20130040575 A | 4/2013 |
| KR | 20140083739 A | 7/2014 |
| KR | 20160037358 A | 4/2016 |
| KR | 101913460 B1 | 10/2018 |
| KR | 20200033012 A | 3/2020 |

OTHER PUBLICATIONS

Extended European Search Report including Written Opinion for Application No. 21880347.6 dated Oct. 18, 2024. 9 pgs.

BATTERY SYSTEM THERMAL EVENT DETECTION METHOD AND BATTERY SYSTEM USING THE SAME

CROSS REFERENCE TO RELATED APPLICATIONS

The present application is a national phase entry under 35 U.S.C. § 371 of International Application No. PCT/KR2021/013136 filed on Sep. 27, 2021, which claims priority from Korean Patent Application No. 10-2020-0132500 filed on Oct. 14, 2020, the disclosures of which are herein incorporated by reference in their entirety.

TECHNICAL FIELD

The present disclosure relates to a thermal event detection method of a battery system and a battery system using the same.

BACKGROUND ART

Recently, as the demand for electric vehicles increases, fires in the electric vehicle also increase. The fires in the electric vehicles may be caused by damage to batteries. In order to prevent damage to batteries, which causes fires in electric vehicles, there has been applied a technology for diagnosing whether the batteries are damaged by measuring cell voltages, cell temperatures, insulation resistances, and the like of the batteries.

However, if a system managing a battery is operated in a slip mode when a vehicle is parked, it is not possible to measure cell voltages, cell temperatures, insulation resistances, and the like, and accordingly, it is not possible to diagnose whether the battery is damaged. Among fires in electric vehicles caused by batteries, fires that occur during parking actually account for about 21%. Therefore, it is necessary to diagnose batteries not only while electric vehicles are driving but also while electric vehicles are parked.

SUMMARY

Technical Problem

The present invention has been made in an effort to provide a method capable of detecting a thermal event in a battery and a battery system using the same.

Technical Solution

An exemplary embodiment of the present invention provides a battery system including: a battery pack including a plurality of battery cells; a pressure sensor located inside the battery pack to measure an internal pressure of the battery pack every sampling cycle; and a battery management system configured to update a reference pressure based on an average of internal pressures measured at sampling cycles for a sampling period, calculate a pressure fluctuation amount based on a difference of the internal pressure measured every sampling cycle from the reference pressure, and determine occurrence of a thermal event in the battery pack if the internal pressure measured every sampling cycle increases consecutively at least two times when the pressure fluctuation amount is greater than or equal to a predetermined threshold pressure.

When the battery management system is in a sleep mode, the pressure sensor may be configured to update a reference pressure based on an average of internal pressures measured at sampling cycles for a sampling period, calculate a first pressure fluctuation amount based on a difference of the internal pressure measured every sampling cycle from the reference pressure, and wake up the battery management system when the first pressure fluctuation amount is greater than or equal to a predetermined threshold pressure.

After the battery management system is woken up, the battery management system may be configured to determine that the battery pack is abnormal if the internal pressure measured every sampling cycle increases consecutively at least two times.

The battery management system may be configured to, after determining that the thermal event has occurred, measure voltages and temperatures of the plurality of battery cells and an insulation resistance between the battery pack and the ground, and determine that the battery pack is abnormal if at least one of the voltages of the plurality of battery cells, the temperatures of the plurality of battery cells, or the insulation resistance is abnormal.

The battery management system is configured to determine that the battery pack is abnormal if at least one of a first condition in which at least one of voltages of the plurality of battery cells is greater than or equal to a threshold voltage, a second condition in which at least one of temperatures of the plurality of battery cells is greater than or equal to a threshold temperature, or a third condition in which an insulation resistance between the battery pack and the ground is smaller than or equal to a predetermined threshold resistance is satisfied.

The battery system may further include a relay connecting the battery pack and an output terminal of the battery system to each other, and the battery management system may be configured to open the relay in response to a determination that the battery pack is abnormal.

The battery management system may be configured to, in response to a determination that the battery pack is abnormal, output a notification to a vehicle including the battery system that the battery pack is abnormal.

The battery system may further include an auxiliary power supply configured to supply power to the pressure sensor.

Another exemplary embodiment of the present invention provides a thermal event detection method of a battery system including a battery pack including a plurality of battery cells, a pressure sensor located inside the battery pack, and a battery management system, the thermal event detection method including: measuring, by the pressure sensor, an internal pressure of the battery pack every sampling cycle; updating, by the battery management system, a reference pressure based on an average of internal pressures measured at sampling cycles for a sampling period; calculating, by the battery management system, a pressure fluctuation amount based on a difference of the internal pressure measured every sampling cycle from the reference pressure; determining, by the battery management system, whether the pressure fluctuation amount is greater than or equal to a predetermined threshold pressure; and determining, by the battery management system, occurrence of a thermal event in the battery pack if the internal pressure measured every sampling cycle increases consecutively at least two times when the pressure fluctuation amount is greater than or equal to the threshold pressure.

When the battery management system is in a sleep mode, the method may further include updating, by the pressure sensor, the reference pressure, calculating, by the pressure sensor, the pressure fluctuation amount, and determining, by the pressure sensor, whether the pressure fluctuation amount is greater than or equal to the threshold pressure.

The thermal event detection method may further include waking up, by the pressure sensor, the battery management system, in response to the pressure fluctuation amount being greater than or equal to the threshold pressure.

The method may further include determining, by the battery management system, the occurrence of the thermal event in response to the battery management system being woken up by the pressure sensor.

The determining of the occurrence of the thermal event in the battery pack may include: calculating, by the battery management system, a pressure difference by subtracting an internal pressure measured at a previous sampling cycle from an internal pressure measured at a current sampling cycle; determining, by the battery management system, whether the calculated pressure difference is greater than or equal to 0; and determining, by the battery management system, that the internal pressure increases if the calculated pressure difference is greater than or equal to 0.

Advantageous Effect

Provided is a method capable of detecting a thermal event in a battery and a battery system using the same.

DETAILED DESCRIPTION

Figure 1:
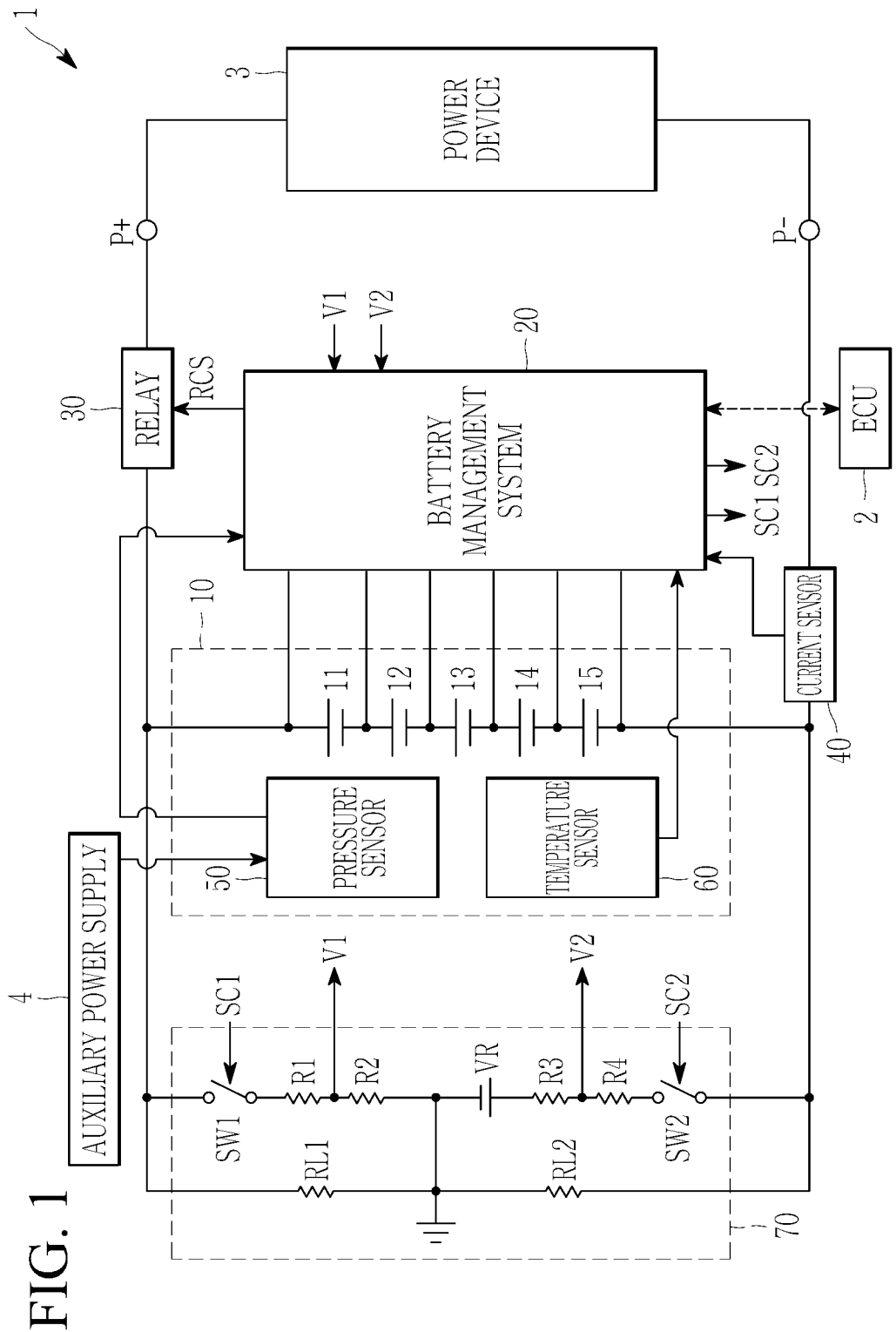
FIG. 1 is a diagram illustrating a battery system according to an exemplary embodiment.

Hereinafter, exemplary embodiments disclosed in the present specification will be described in detail with reference to the accompanying drawings, but the same or similar components will be denoted by the same or similar reference numerals, and an overlapping description therefor will be omitted. Terms "module" and/or "unit" for components used in the following description are used only to easily make the specification. Therefore, these terms do not have meanings or roles that distinguish from each other in themselves. In addition, when it is determined in describing exemplary embodiments disclosed in the present specification that a detailed description for relevant known technologies may unnecessarily obscure the gist of the exemplary embodiments disclosed in the present specification, the detailed description therefor will be omitted. Further, the accompanying drawings are provided only to help easily understand exemplary embodiments disclosed in the present specification, and the spirit disclosed in the present specification is not limited by the accompanying drawings. It should be understood that the spirit and the scope of the present invention includes all modifications, equivalents, and substitutions.

Terms including ordinal numbers such as first and second may be used to describe various components, but these components are not limited by these terms. These terms are used only for the purpose of distinguishing one component from another component.

It is to be understood that when one component is referred to as being "connected to" another component, one component may be connected directly to another component or be connected to another component with an intervening component therebetween. On the other hand, it is to be understood that when one component is referred to as being "directly connected to" another component, one component may be connected to another component with no intervening component therebetween.

It should be understood that terms "include", "have", and the like used in the present application specify the presence of features, numerals, steps, operations, components, parts mentioned in the specification, or a combination thereof, but do not preclude the presence or addition of one or more other features, numerals, steps, operations, components, parts, or a combination thereof.

FIG. 1 is a diagram illustrating a battery system according to an exemplary embodiment.

A battery system 1 may be mounted on a vehicle and connected to a power device 3 for generating various power sources required for operating the vehicle and charging the battery system 1. An electronic control unit (ECU) 2 controlling the operation of the vehicle may transmit/receive information to/from a battery management system 20 through controller area network (CAN) communication.

The battery system 1 may include a battery pack 10, a battery management system (BMS) 20, a relay 30, a current sensor 40, a pressure sensor 50, a temperature sensor 60, and an insulation resistance calculation circuit 70.

The battery pack 10 includes a plurality of battery cells 11 to 15 connected to each other in series. Although it is illustrated in FIG. 1 that the battery pack 10 includes five battery cells 11 to 15, this is an example, and the present invention is not limited thereto.

The relay 30 is connected between a positive electrode of the battery pack 10 and an output terminal P+, and is opened or closed by a control of the BMS 20. For example, the relay 30 may be closed according to an on-level relay control signal (RCS) received from the BMS 20, and may be opened according to an off-level relay control signal (RCS). Although only one relay is illustrated in FIG. 1, this is an example, and the present invention is not limited thereto. A further relay may be connected between a negative electrode of the battery pack 10 and an output terminal P−.

The current sensor 40 may sense a current flowing through the battery pack 10 (hereinafter, battery current), and the current sensor 40 may transmit a signal indicating the sensed current to the BMS 20.

The pressure sensor 50 may be located inside the battery pack 10 to measure an internal pressure of the battery pack 10 every sampling cycle and transmit the measured pressure to the BMS 20. When the vehicle is parked, the BMS 20 may be changed into a sleep mode. During the sleep mode, the BMS 20 does not measure voltages of the cells, temperatures of the cells, insulation resistances, and the like in the battery pack 10. During the sleep mode of the BMS 20, the pressure sensor 50 may update a reference pressure based on an average of internal pressures measured at sampling cycles for a sampling period, calculate a first pressure fluctuation amount based on a difference of an internal pressure measured every sampling cycle from the reference pressure, and wake up the BMS 20 when the first pressure fluctuation amount is greater than or equal to a predetermined threshold pressure.

In an active mode in which the vehicle is travelling, the BMS 20 may receive an internal pressure measured by the pressure sensor 50, update a reference pressure based on an average of internal pressures measured at sampling cycles for a sampling period, calculate a first pressure fluctuation amount based on a difference of an internal pressure measured every sampling cycle from the reference pressure, and determine that a thermal event has occurred in the battery pack 10 when the first pressure fluctuation amount is equal to or greater than a predetermined threshold pressure. The thermal event means that heat is generated inside the battery pack 10, which indicates a risk of fire, explosion, or the like. The generation of heat inside the battery pack 10 causes an increase in internal pressure. Thus, in an exemplary embodiment, an occurrence of a thermal event may be detected by measuring an internal pressure of the battery pack 10.

The reference pressure may be updated, by the BMS 20 in the active mode or by the pressure sensor 50 in the sleep mode, by averaging internal pressures measured at sampling cycles for the sampling period. The sampling period is set as a period up to a current sampling time point from a time point before a predetermined time based on the current sampling time point. The reference voltage may be updated every sampling period by the BMS 20 in the active mode or by the pressure sensor 50 in the sleep mode. Accordingly, the reference pressure may be updated every sampling cycle. Since the reference pressure is updated based on an average for a sampling period, it is possible to reduce an influence of noise, which causes an internal pressure to be measured as having a peak value.

The pressure sensor 50, which needs to operate even when the BMS 20 is in sleep mode, is supplied with power from an auxiliary power supply 4 instead of the battery pack 10. The auxiliary power supply 4 may be separately provided in the battery system 10 or in the vehicle.

The temperature sensor 60 may be installed inside the battery pack 10 to measure a temperature of each of the plurality of battery cells 11 to 15. The temperature sensor 60 may transmit a signal indicating the measured temperature of each of the plurality of battery cells 11 to 15 to the BMS 20. The BMS 20 may be connected to the plurality of battery cells 11 to 15 to measure voltages of the plurality of battery cells 11 to 15 and a voltage of the battery pack 10, receive information including a battery current, temperatures of the plurality of battery cells 11 to 15, an internal pressure of the battery pack 10, and the like, control a charging/discharging current of the battery pack 10 based on the voltages of the plurality of battery cells 11 to 15 and the battery current, and the like, and control a cell balancing operation for the plurality of battery cells 11 to 15.

In order to control the battery pack 10 to be charged or discharged, the BMS 20 controls the relay 30 to be opened or closed. The BMS 20 may generate and supply a control signal (RCS) for controlling the relay 30 to be opened or closed.

The BMS 20 controls the insulation resistance calculation circuit 70 to calculate insulation resistances using measured voltages V1 and V2 required for calculating the insulation resistances. In FIG. 1, it is illustrated that an insulation resistance RL1 between the positive electrode of the battery pack 10 and the ground and an insulation resistance RL2 between the negative electrode of the battery pack 10 and the ground are connected to each other. This is an example for describing the insulation resistances RL1 and RL2, and the present invention is not limited thereto.

The insulation resistance calculation circuit 70 is connected between the positive electrode and the negative electrode of the battery pack 10 and to the ground. The insulation resistance calculation circuit 70 includes two switches SW1 and SW2, four resistors R1 to R4, and a reference voltage source VR. The switch SW1, the resistor R1, and the resistor R2 are connected between the positive electrode of the battery pack 10 and the ground, and the switch SW2, the resistor R3, the resistor R4, and the reference voltage source VR are connected between the negative electrode of the battery pack 10 and the ground. The switch SW1 is switched according to a switching signal SC1 supplied from the BMS 20, and the switch SW2 is switched according to a switching signal SC2 supplied from the BMS 20. The BMS 20 turns on or off each of the switches SW1 and SW2 by generating each of the switching signals SC1 and SC2 as an on-level signal or an off-level signal.

Hereinafter, a method for determining an occurrence of a thermal event using a pressure sensor will be described.

Figure 2:
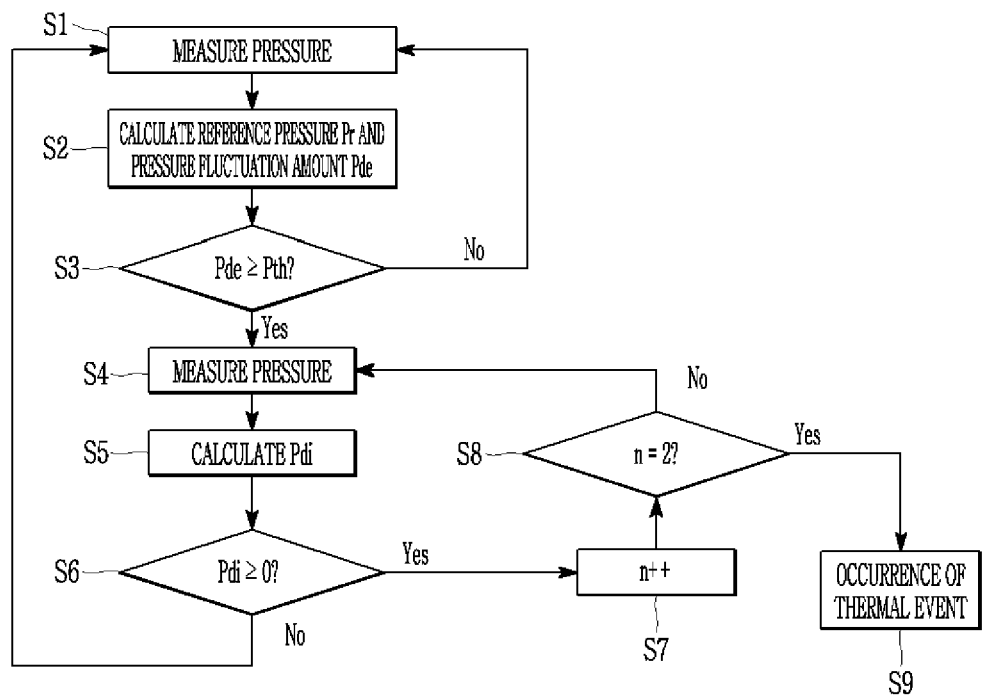
FIGS. 2 and 3 are flowcharts each illustrating a method for determining an occurrence of a thermal event according to an exemplary embodiment.

FIG. 2 is a flowchart illustrating a method for determining an occurrence of a thermal event according to an exemplary embodiment.

FIG. 2 is a flowchart illustrating a method for determining an occurrence of a thermal event when the BMS 20 is in an active mode in which the vehicle is in operation.

First, the pressure sensor 50 measures an internal pressure of the battery pack 10 (S1). The pressure sensor 50 measures an internal pressure every sampling cycle. For example, the sampling cycle may be 0.1 seconds. The pressure sensor 50 transmits the measured internal pressure to the BMS 20, and the BMS 20 updates a reference pressure Pr according to the received internal pressure and calculates a pressure fluctuation amount Pde that is a difference between the received internal pressure and the reference pressure (S2). In this case, the reference pressure Pr is an average of internal pressures measured for a sampling period up to a current internal pressure measurement time point from a predetermined period (e.g., 10 seconds) before the current internal pressure measurement time point.

The BMS 20 determines whether the pressure fluctuation amount Pde calculated in step S2 is greater than or equal to a threshold pressure Pth (S3). The threshold pressure may be set as a value of change in internal pressure of the battery pack, which is set to recognize battery cell venting when a thermal event occurs. That is, when the amount of fluctuation in internal pressure of the battery pack 10 resulting from cell venting is greater than or equal to the threshold pressure, there may be a cell where venting has occurred among the plurality of battery cells 11 to 15. The threshold pressure Pth may be obtained by an experimental method, and may be, for example, 1 kPa.

The pressure sensor 50 measures an internal pressure of the battery pack 10 (S4). When the pressure fluctuation amount Pde is greater than or equal to the threshold pressure Pth as a result of the determination in step S3, the BMS 20 calculates a pressure difference PDi (where i is a natural number) by subtracting the previously measured internal pressure (e.g., the internal pressure measured in step S1) from the currently measured internal pressure (e.g., the internal pressure measured in step S4) (S5).

The BMS 20 determines whether the pressure difference PDi is greater than or equal to 0 (S6).

If the pressure difference PDi is greater than or equal to 0 as a result of the determination in step S6, the BMS 20 adds 1 to a count value n (S7). Subsequently, the BMS 20 determines whether the count value n is 2 (S8). It is described in an exemplary embodiment that, in order to determine whether the internal voltage continuously rises, it is determined twice whether the pressure difference PDi is greater than or equal to 0. However, the present invention is not limited thereto, and it may be determined three or more times depending on design whether the pressure difference PDi is greater than or equal to 0.

If the count value n is not 2 as a result of the determination in step S8, the process is repeated from step S4. If the count value n is 2 as a result of the determination in step S8, the BMS 20 determines that a thermal event has occurred (S9).

If the pressure difference PDi is smaller than 0 as a result of the determination in step S6, the process is repeated from step S1. If the pressure fluctuation amount Pde is smaller than the threshold pressure Pth as a result of the determination in step S3, the process is repeated from step S1.

Figure 3:
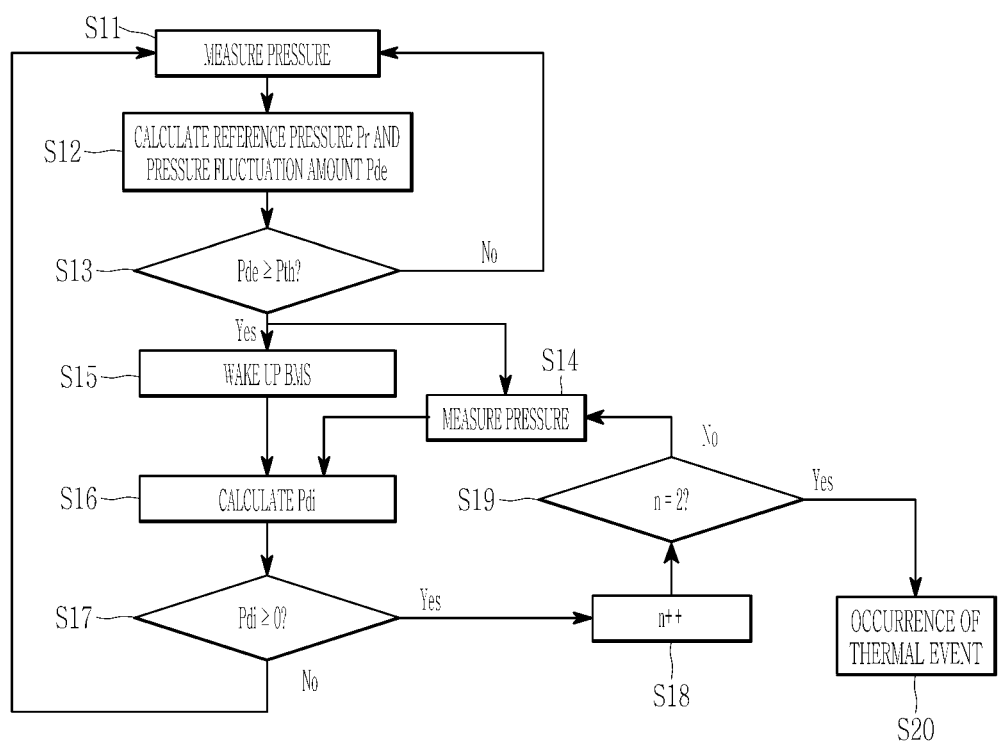

FIG. 3 is a flowchart illustrating a method for determining an occurrence of a thermal event according to an exemplary embodiment.

FIG. 3 is a flowchart illustrating a method for determining an occurrence of a thermal event when the BMS 20 is in a sleep mode in which the vehicle is not in operation, such as when the vehicle is parked.

First, the pressure sensor 50 measures an internal pressure of the battery pack 10 (S11). The pressure sensor 50 measures an internal pressure every sampling cycle. For example, the sampling cycle may be 0.66 seconds. That is, the sampling cycle in the sleep mode is longer than that in the active mode.

The pressure sensor 50 updates a reference pressure Pr according to the measured internal pressure, and calculates a pressure fluctuation amount Pde that is a difference between the measured internal pressure and the reference pressure (S12). In this case, the reference pressure Pr is an average of internal pressures measured for a sampling period up to a current internal pressure measurement time point from a predetermined period (e.g., 5 minutes) before the current internal pressure measurement time point. That is, the sampling period in the sleep mode is longer than that in the active mode.

The pressure sensor 50 determines whether the pressure fluctuation amount Pde calculated in step S12 is greater than or equal to a threshold pressure Pth (S13).

The pressure sensor 50 measures an internal pressure of the battery pack 10 (S14). When the pressure fluctuation amount Pde is greater than or equal to the threshold pressure Pth as a result of the determination in step S13, the pressure sensor 50 transmits a wake-up signal to the BMS 20, and the BMS 20 is woken up (S15).

The BMS 20 calculates a pressure difference PDi (where i is a natural number) by subtracting the previously measured internal pressure (e.g., the internal pressure measured in step S11) from the currently measured internal pressure (e.g., the internal pressure measured in step S14) (516).

The BMS 20 determines whether the pressure difference PDi is greater than or equal to 0 (S17).

If the pressure difference PDi is greater than or equal to 0 as a result of the determination in step S17, the BMS 20 adds 1 to a count value n (S18). Subsequently, the BMS 20 determines whether the count value n is 2 (S19). It is described in an exemplary embodiment that, in order to determine whether the internal voltage continuously rises, it is determined twice whether the pressure difference PDi is greater than or equal to 0. However, the present invention is not limited thereto, and it may be determined three or more times depending on design whether the pressure difference PDi is greater than or equal to 0.

If the count value n is not 2 as a result of the determination in step S19, the process is repeated from step S14. If the count value n is 2 as a result of the determination in step S19, the BMS 20 determines that a thermal event has occurred (S20).

If the pressure difference PDi is smaller than 0 as a result of the determination in step S17, the process is repeated from step S11. If the pressure fluctuation amount Pde is smaller than the threshold pressure Pth as a result of the determination in step S13, the process is repeated from step S11.

When it is determined that a thermal event has occurred, the BMS 20 may determine whether a measured cell voltage is greater than or equal to a predetermined threshold voltage, whether a cell temperature received from the temperature sensor 60 is greater than or equal to a predetermined threshold temperature, or whether an insulation resistance measured using the insulation resistance calculation circuit 70 is smaller than or equal to a threshold resistance, which indicates that insulation has been broken down. When at least one of the condition in which the measured cell voltage is greater than or equal to the threshold voltage, the condition in which the cell temperature is greater than or equal to the threshold temperature, and the condition in which the insulation resistance is smaller than or equal to the threshold resistance is satisfied, the BMS 20 may notify the ECU 2 that there is a risk of fire or explosion, such that the relay 30 is blocked.

As described above, according to an exemplary embodiment, an occurrence of a thermal event can be detected even in the sleep mode as well as the active mode of the BMS, thereby not only preventing a fire in the battery pack but also preventing a fire in the vehicle resulting from the fire in the battery pack.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A battery system comprising:
a battery pack including a plurality of battery cells;
a pressure sensor to measure an internal pressure of the battery pack every sampling cycle; and
a battery management system is configured to:
update a reference pressure based on internal pressures measured at sampling cycles for a sampling period;
calculate a pressure fluctuation amount based on a difference of the internal pressure measured every sampling cycle from the reference pressure; and
determine occurrence of a thermal event in the battery pack if the internal pressure measured every sampling cycle increases consecutively at least two times when the pressure fluctuation amount is greater than or equal to a predetermined threshold pressure.

2. The battery system of claim 1, wherein
when the battery management system is in a sleep mode, the pressure sensor is configured to:
update a reference pressure based on an average of internal pressures measured at sampling cycles for a sampling period;
calculate a first pressure fluctuation amount based on a difference of the internal pressure measured every sampling cycle from the reference pressure; and
wake up the battery management system when the first pressure fluctuation amount is greater than or equal to a predetermined threshold pressure.

3. The battery system of claim 2, wherein
after the battery management system is woken up, the battery management system is configured to determine that the battery pack is abnormal if the internal pressure measured every sampling cycle increases consecutively at least two times.

4. The battery system of claim 1, wherein the battery management system is configured to:
after determining that the thermal event has occurred, measure voltages and temperatures of the plurality of battery cells and an insulation resistance between the battery pack and the ground; and
determine that the battery pack is abnormal if at least one of the voltages of the plurality of battery cells, the temperatures of the plurality of battery cells, or the insulation resistance is abnormal.

5. The battery system of claim 4, further comprising:
a relay connecting the battery pack and an output terminal of the battery system to each other,
wherein the battery management system is configured to open the relay in response to a determination that the battery pack is abnormal.

6. The battery system of claim 4, wherein
the battery management system is configured to, in response to a determination that the battery pack is abnormal, output a notification to a vehicle including the battery system that the battery pack is abnormal.

7. The battery system of claim 1, wherein
the battery management system is configured to determine that the battery pack is abnormal if at least one of: (a) a first condition in which at least one of voltages of the plurality of battery cells is greater than or equal to a threshold voltage, (b) a second condition in which at least one of temperatures of the plurality of battery cells is greater than or equal to a threshold temperature, or (c) a third condition in which an insulation resistance between the battery pack and the ground is smaller than or equal to a predetermined threshold resistance, is satisfied.

8. The battery system of claim 1, further comprising:
an auxiliary power supply configured to supply power to the pressure sensor.

9. A thermal event detection method of a battery system including a battery pack including a plurality of battery cells, a pressure sensor, and a battery management system, the thermal event detection method comprising:
measuring, by the pressure sensor, an internal pressure of the battery pack every sampling cycle;
updating, by the battery management system, a reference pressure based on an average of internal pressures measured at sampling cycles for a sampling period;
calculating, by the battery management system, a pressure fluctuation amount based on a difference of the internal pressure measured every sampling cycle from the reference pressure;
determining, by the battery management system, whether the pressure fluctuation amount is greater than or equal to a predetermined threshold pressure; and
determining, by the battery management system, occurrence of a thermal event in the battery pack if the internal pressure measured every sampling cycle increases consecutively at least two times when the pressure fluctuation amount is greater than or equal to the threshold pressure.

10. The thermal event detection method of claim 9, further comprising:
when the battery management system is in a sleep mode, updating, by the pressure sensor, of the reference pressure based on an average of internal pressures measured at sampling cycles for a sampling period;
calculating, by the pressure sensor, of the pressure fluctuation amount; and
determining, by the pressure sensor, whether the pressure fluctuation amount is greater than or equal to the threshold pressure.

11. The thermal event detection method of claim 10, further comprising:
waking up, by the pressure sensor, the battery management system, in response to the pressure sensor determining that the pressure fluctuation amount is greater than or equal to the threshold pressure.

12. The thermal event detection method of claim 10, further comprising:
determining, by the battery management system, the occurrence of the thermal event in the battery pack in response to the battery management system being woken up by the pressure sensor.

13. The thermal event detection method of claim 9, wherein
determining the occurrence of the thermal event in the battery pack includes:
calculating, by the battery management system, a pressure difference by subtracting an internal pressure measured at a previous sampling cycle from an internal pressure measured at a current sampling cycle;
determining, by the battery management system, whether the calculated pressure difference is greater than or equal to 0; and
determining, by the battery management system, that the internal pressure increases if the calculated pressure difference is greater than or equal to 0.

* * * * *